Figure 1:
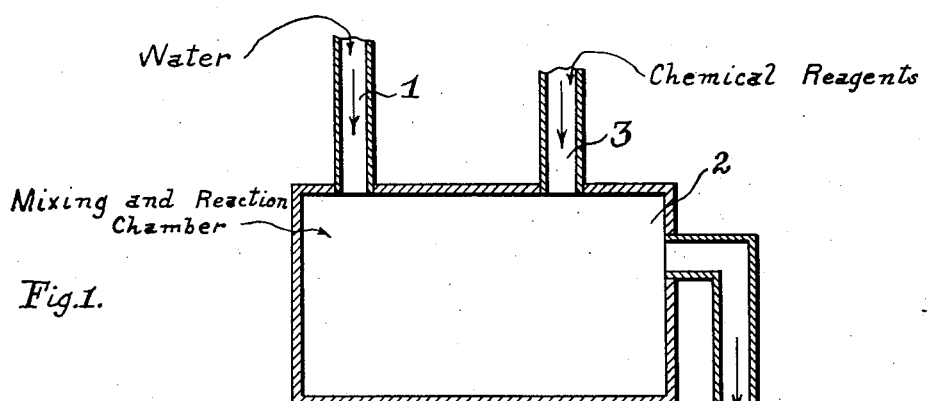

Oct. 18, 1938.  G. W. KÜHL  2,133,895

PROCESS OF SOFTENING WATER

Filed Oct. 7, 1936

Inventor
Georg Walter Kühl

By Emil Rönnelgehe
Attorney

Patented Oct. 18, 1938

2,133,895

UNITED STATES PATENT OFFICE 2,133,895

PROCESS OF SOFTENING WATER

Georg Walter Kühl, Helmstedt/Braunschweig, Germany

Application October 7, 1936, Serial No. 104,538
In Germany October 7, 1935

8 Claims. (Cl. 204—25)

The object of the invention is to provide a process of accelerating the precipitation of precipitates including colloidal dissolved substances, from liquids in precipitation processes, particularly water softening processes.

The separation of precipitates from liquids, especially of matter precipitated in softening water, is very slow due to the products of reaction passing during their precipitation through a stage during which the particles are only of colloidal size. This disadvantage makes itself felt particularly when the water is purified in a cold condition, and this slow precipitation renders necessary the use of large clarifying containers.

According to the invention the separation is facilitated and accelerated by the liquid containing the matter in an insoluble form, but in a fine state of dispersion, being introduced into a uniting or coagulating chamber containing electrodes in the form of pieces of metal such as chips, spiral, rings, balls, cubes, cones, cylinders and so forth. These pieces of metal form a large number of galvanic elements of low voltage, for instance 0.7 volt, so that a discharge takes place in the uniting chamber of the colloidal parts, such as calcium carbonate in suspension. These particles consequently unite to form a precipitate which may be readily filtered out with consequential rapid separation. The electrodes may be simply in the form of small metal turnings, a few millimeters in height and diameter.

It has been proposed to cause finely distributed metal particles to act as electrodes on liquids, but in connection with a different process adapted to effect separation of a metal, such as gold from sea-water, the gold being deposited on the electrodes and the valueless metal being dissolved.

The best results are obtained by using electrodes of such a shape and size that, in conjunction with a rapid flow of liquid through the uniting chamber and thus through the electrodes, a filtering action is obtained, i. e. the separated matter is prevented from settling on the electrodes, the actual separation of the matter being effected by a filter arranged after the precipitation chamber.

The uniting chamber may be partly or entirely filled with the electrode bodies, but the latter must, of course, occupy the whole cross sectional area of the chamber. It is important that there should be no filtering action by the electrodes themselves because in this case the separated material would settle on the electrodes to a certain extent and consequently impair their action. Moreover, the space between the electrodes would fill up in a short time to such an extent as to obstruct the passage of the liquid. For this reason also the electrode should not be in the form of fine granules as used in the known process hereinbefore described.

The electrodes may consist of metal or of metallic alloys of various kinds, such as zinc and iron; they must, however, occupy different positions in the electro-chemical electromotive series.

A particularly efficient action is obtained by using as one kind of electrode one consisting of an alloy of 85 to 90% aluminium, 5 to 10% copper, 1.5 to 4.5% of zinc, 0.5 to 2.5% lead, particularly good results being obtained with a metallic alloy composed of 88% aluminium, 8% copper, 2.5% zinc and 1% lead. The complementary electrodes may be of any suitable material occupying a different position in the electrochemical electromotive series, for example, they may be of copper, iron or brass. The aluminium alloy above referred to may contain the usual impurities present in commercial aluminium, such as iron, magnesium, without affecting their action.

The process is applicable to all cases where precipitates or colloidal dissolved substances are to be rapidly separated from the liquid, it being immaterial whether the matter be already present in the liquid in an insoluble condition but in a fine state of dispersion, or whether the substance has to be first separated by treatment with reagents. The latter condition generally obtains in softening water, as by means of alkaline precipitants, such as chalk, soda, hydrate of lime, alkali phosphate and so forth. In applying the process to such water softening processes the chemical reaction during the precipitation of the hardening constituents may be accelerated by the softening agents employed being brought into contact with metals, preferably metallic alloys, before being introduced into the water to be softened, so that these metals or alloys are dissolved to a certain extent in the reaction liquid. It is advantageous to also add to the precipitants those alloys which will cause the metals to dissolve in the form of complex salts, preferably of a colloidal nature. For this purpose the aluminium brass alloy hereinbefore referred to for the production of electrodes, may be used.

This process results in the alkaline softening agents to be added to the water being, to a certain extent, impregnated with the complex salts.

Other metals or alloys may obviously be used, providing that they have, even if only to a slight extent, the desired action on the alkaline solutions.

The process may be carried out in practice in different ways, for example, the metals or metallic alloys in the form of small chips or larger compact pieces may be introduced into the container containing the softening agents, the contents being then intimately mixed together by stirring with the aid of the stirring device usually provided in such apparatus.

The blades or arms of the stirring device may themselves be made of the alloy, such blades or arms being detachable to allow of renewal, or the blades may be provided with detachable metal parts.

The process may also be carried out by the precipitant solution, prior to its introduction into the hard water, being first filtered through pieces or chips of the metal or alloy, so that they are brought into intimate contact with the latter.

The electrolytic action may be increased by employing a filter composed of a mixture of electro-positive and electro-negative metals, i. e. a short circuit filter. With such filtration particularly effective action is obtained as regards impregnation of the precipitant by using the above mentioned alloy of brass and aluminium.

Tests have disclosed that the process according to the invention results in the reaction period being reduced to a few minutes, with very efficient softening even with cold water and with the use of a theoretically adequate quantity of chemical reagents, instead of operating as usual with an excess of alkali.

Apparatus for carrying out the process in connection with water softening is shown in the accompanying drawing.

The water to be softened is introduced by way of a pipe 1 into the mixing and reaction chamber 2, into which the chemical reagents are introduced by way of the pipe 3. Below the reaction chamber 2 is a uniting chamber 4 containing the electrodes, composed for example of zinc and iron, arranged irregularly on a sieve 5 or the like.

Figure 2:
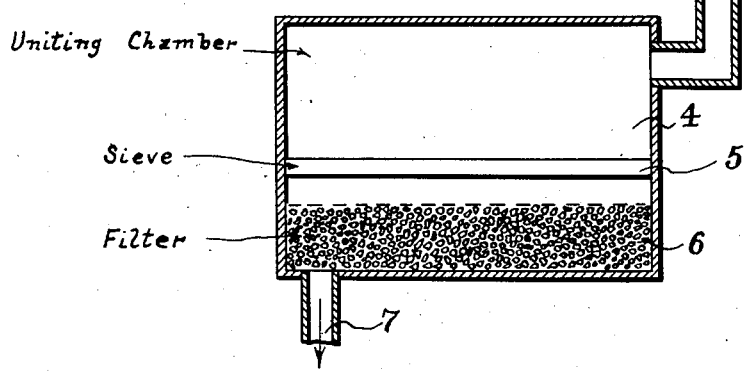

Fig. 2 shows in plan and side elevation one form of electrode which is of spiral formation. Electrodes in the form of turnings are preferred, and these bodies have advantageously a height and diameter of a few millimeters. The action of the electric current generated by the electrodes causes the finely dispersed substances precipitated by the chemical reaction, or the substances already present in the water, to pack together and unite and they are readily separated from the liquid by the subsequent filter 6, which latter may be composed of pyrites. The purified water is discharged from the container at 7. The action of the process may be improved by heating.

What I claim as my invention and desire to secure by Letters Patent of the United States is:—

1. A process for the chemical softening of water with alkaline softening agents, comprising the steps of forcing the water, after precipitation of the hardening constituents with said softening agents and before flocculation and settling of colloidal material, to flow through a flocculation chamber in which is arranged a bed consisting of a number of contacting electrodes consisting of at least two materials of different potential, the dimensions of the electrodes and the speed of flow of the water being such that any appreciable deposition of the material to be flocculated is avoided on the electrodes, and subsequently separating the flocculated materials in a separate filter.

2. A process according to claim 1, in which the electrodes are in the form of open hollow bodies.

3. A process according to claim 1, in which the electrodes are in the form of open hollow bodies, the open hollow bodies forming the electrodes being substantially uniform in size and shape.

4. A process according to claim 1 in which the electrodes consist of 85–90% aluminum, 5–10% copper, 1.5–4.5% zinc, and 0.5–2.5% lead.

5. A process according to claim 1, in which the electrodes consist of approximately 88% aluminum, 8% copper, 2.5% zinc and 1.5% lead.

6. A process according to claim 1, in which the filter is in the form of a gravel filter.

7. A process according to claim 1, in which the electrodes are in the form of open hollow bodies as cuttings of small dimensions.

8. A process according to claim 1, in which the electrodes are in the form of open hollow bodies as turnings of small dimensions.

GEORG WALTER KÜHL.